United States Patent Office
3,125,556
Patented Mar. 17, 1964

3,125,556
PROCESS OF MAKING HYDROXYALKYLATED POLYVINYL ALCOHOL
John C. Lukman, Fitchburg, Philip L. Gordon, Lexington, and Donald E. Dean, Fitchburg, Mass., assignors to The Borden Company, New York, N.Y., a corporation of New Jersey
No Drawing. Filed Apr. 27, 1961, Ser. No. 105,866
7 Claims. (Cl. 260—91.3)

This invention relates to the manufacture of alkoxylated polyvinyl alcohols and particularly to the rapid alkoxylation of polyvinyl alcohol in the presence of a particular alkoxylation catalyst and preferably with special treatment of the alcohol prior to the alkoxylation, to obtain alkoxylated polyvinyl alcohols that are completely cold water soluble.

Briefly stated, the instant invention comprises the method of reacting a polyvinyl alcohol with an alkylene oxide in the presence of ammonia as a catalyst. In one embodiment of the invention, the polyvinyl alcohol is fractured to particles of size to pass to the extent of at least 80% through a 100 mesh screen and for best results through 140 mesh and/or treated with a swelling agent prior to reaction with the alkylene oxide. In another embodiment, the catalyst is a combination of ammonia and an alkanol amine.

As to materials, the polyvinyl alcohol used is one made in any conventional manner by hydrolysis, usually alkaline, of a polyvinyl ester of a lower ethenoid acid, such as polyvinyl acetate. The hydrolysis may be about 80%–100% complete and the viscosity about 2–100 cps. and at least 5 cps. when the alkoxylated product is to be used in making film. The viscosity stated here and elsewhere herein is that of a 4% solution in water at 20° C. Polyvinyl alcohols 80%–100% hydrolyzed and with viscosities of about 16–60 cps. are particularly suitable.

The polyvinyl alcohol or mixture with any remaining ester is alkoxylated.

The alkylene oxide used may be any of the $C_2$–$C_4$ alkylene oxides having an oxirane group therein, namely, ethylene, 1,2-propylene, and 2,3-butylene oxides and homologs thereof. Styrene oxide and like oxides of the vinyl group are also suitable. The higher boiling members of the alkylene oxide family and such materials as trimethylene oxide and 4-methyl 1,3-dioxane are operable but not recommended, partly because of the excessive slowness of the reaction.

Ammonia is the catalyst for the desired fast reaction. It can be added, to the reaction mixture, either in the form of gaseous ammonia or as ammonium hydroxide. Ammonium hydroxide solution such as the 26% commercial is both convenient and satisfactory. The ammonia catalyst gives a rapid initial rate of alkoxylation, but the rate decreases as the alkoxylation progresses. This may be explained by the gradual conversion of the ammonia to an ethanol amine, of which triethanolamine is an example, as illustrated by the equation:

$$NH_3 + 3C_2H_4O \rightleftharpoons N(C_2H_4OH)_3$$

The variation in rate of alkoxylation of the polyvinyl alcohol, as shown by the evolution of heat, is decreased by use with the ammonia of an alkanolamine, e.g., mono-, di-, or triethanol amine or a $C_3$ or $C_4$ homolog thereof.

Furthermore, we consider that the admixture of the alkanol amine affects favorably the flexibility of films made from the reacted product. We consider that the alkoxylation of the alkanol amine, to give a product represented empirically, in the case of triethanol amine and ethylene oxide, as follows:

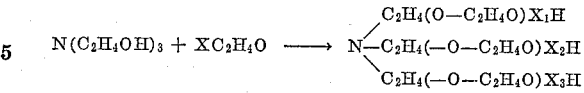

in which X is an integer within the range 1–30, e.g., 3–12, and $X_1 + X_2 + X_3$ equal X.

The swelling agent used is an organic polar partial solvent for polyvinyl alcohol, i.e., it swells the particles of the alcohol without dissolving them at the temperature of use. Suitable examples of such swelling agents are dimethyl formamide, dimethyl acetamide, and dimethyl sulfoxide. It is believed that the effect of the swelling agents is physical and not chemical, resulting the swelling of the polyvinyl alcohol particles thereby increasing the surface area for reaction purposes or increasing the penetrability of them to the alkylene oxide. The result is a more rapid and more nearly uniform alkoxylation of the polyvinyl alcohol and, in films prepared therefrom, better solubility in water and low temperature flexibility.

As to proportions, the following table shows ranges that are permissible and also those that are recommended for best results in commercial operations. In this table and elsewhere herein, proportions are expressed as parts by weight unless specifically stated to the contrary.

| Material | Parts By Weight | |
|---|---|---|
| | Permissible | Recommended |
| Polyvinyl alcohol | 100 | 100 |
| Alkylene oxide | 5–100 | 25–75 |
| Swelling agent | 0–8 | 3–6 |
| Ammonia, calc. as $NH_3$ | 0.2–1 | 0.4–0.8 |
| Alkanol amine | 0–10 | 1–4.6 |
| Ammonia plus the amine | 0.2–11 | 1–5 |

More than 5 parts total of the catalyst mixture is unnecessary and uneconomical and, if used, would increase the difficulty of controlling the alkoxylation reaction. The alkanol amine, when used, is in proportion in excess of the ammonia calculated as ammonia.

The minimum proportion of alkylene oxide charged is determined by the degree of alkoxylation required, as for proper solubility, viscosity, and mechanical properties of the alkoxylated product in the particular use for which the product is intended. Since we do not require and do not want solvent action of the alkylene oxide on the solid particles in our reaction, we use little or no excess over the theoretical amount of the oxide to be reacted.

As to operating conditions, since the reaction between the polyvinyl alcohol and alkylene oxide is an exothermic one, the temperature and pressure of the reaction are adjusted to prevent charring and discoloration of the resultant alkoxylated polyvinyl alcohol.

The reaction, for commercially satisfactory speeds, is effected at an elevated usable temperature as, for example, about 40°–100° C., temperatures of 70°–85° C. being recommended. At lower temperatures the reaction is objectionably slow and at higher temperatures control of the exothermic reaction is difficult.

The operating pressure in the alkoxylation is suitably about 10–100 p.s.i.g., 20–30 lbs. being recommended. As in the case of higher temperatures, the use of the higher pressures requires care to avoid a violent exothermic reaction.

The reaction is carried out in any conventional chemical reactor in which the temperature and pressure can be controlled and stirring effected. The dry polyvinyl alcohol is charged into the reactor and mixed with the ammonium hydroxide catalyst. If anhydrous ammonia is to be used as the catalyst it can be added continuously as the reaction proceeds.

The ethylene oxide is then added, either incrementally or continuously, with constant stirring of the reaction mixture. The incremental or continuous addition make it easier to control the exothermic reaction and permits the reaction to proceed at a relatively low pressure such as 30 p.s.i.g. or less.

The reaction is continued until the desired degree of alkoxylation is obtained. The end point of the reaction with the alkylene oxide introduced can be easily determined by observing the condition in which the pressure within the reaction at constant temperature falls and then becomes practically constant. At a temperature of 75° C. and a pressure of 30 p.s.i.g., the reaction time is about 2–5 hours.

After the reaction is completed, the alkoxylated polyvinyl alcohol is removed as a dry powder.

Commercial polyvinyl alcohol particles vary in size but most of them are 60–80 mesh. As previously set forth, it is advantageous in this process to fracture the polyvinyl alcohol so that at least 80% by weight of the particles pass through a 100 and for best results 80% or more through a 140 mesh screen. This cracking of the polyvinyl alcohol increases the solubility and low temperature flexibility of films prepared from the alkoxylated polyvinyl alcohol.

The fracturing is preferably carried out in apparatus which accelerates the polyvinyl alcohol particles to high speed and by centrifugal force hurls them against target impactors which achieve the size reduction by shattering the particles. A suitable grinder is an Entoleter. This type of grinding is preferred since it creates practically no friction to transfer heat to the alcohol. Polyvinyl alcohol is heat sensitive and it is desirable to keep the temperature below 70° C. to avoid decomposition. Moreover, this conventional "Entoleter" type of mill, an impact centrifuge grinder with a rod cage ("rotor" rotating adjacent to and inside a stationary rod cage "stator"), has a shattering effect on the alcohol particles. It forms irregular shapes and greatly increases the surface area available for reaction with the oxide. Hammer mills, and other grinders, because of the heat they generate in the polyvinyl alcohol particles, cause them to form into more nearly round and dense particles.

The fracturing is best carried out with cooling to increase the brittleness of the alcohol and thus effect better yield of 140 mesh particles, as by mixing the alcohol as fed to the mill with dry ice. The polyvinyl alcohol, during the fracturing, is maintained below the temperature of softening thereof, as below 35° C. and best below 20° C. The fracturing is effected to advantage in an atmosphere of nitrogen, to avoid oxidation.

As previously noted, the fractured polyvinyl alcohol can then be reacted with the alkylene oxide in the presence of the catalyst. The swelling agent, when used, further increases the surface area available for reaction purposes. The swelling agent is added to the fractured alcohol, mixed thoroughly therewith, and the fractured and swollen alcohol is alkoxylated as set forth herein.

For some purposes, the polyvinyl alcohol in subdivided form may be treated with the swelling agent, without the prefracturing described.

The invention will be further illustrated by description in connection with the following specific examples. In these examples and elsewhere herein proportions are expressed as parts by weight unless specifically stated to the contrary.

*Example 1*

70 parts of polyvinyl alcohol (98% hydrolyzed from polyvinyl acetate and having a viscosity of 30 cps.) was charged with 4.4 parts of $NH_4OH$ (26% aqueous solution) into a pressure reactor equipped with a stirrer, pressure gauge, and thermometer. The mixture was stirred, heated to 75° C. and 25.6 parts of ethylene oxide pumped in slowly. The operation continued for 3 hours with continuous stirring of the materials and with the temperature being maintained at 70°–75° C. and the pressure at about 20 p.s.i. The end point of the reaction was indicated by the decrease in rate of fall of the vapor pressure.

The resultant product was light colored, granular, free flowing ethoxylated polyvinyl alcohol with an ethoxy content of 36%. The product was soluble in ambient temperature water.

*Example 2*

The materials and procedures of Example 1 were used, except that the $NH_4OH$ catalyst was replaced by a catalyst mixture consisting of 1.4 parts of $NH_4OH$ (26% aqueous solution) and 2.8 parts of triethanol amine. The rate of reaction was somewhat lower than that of Example 1, taking about 3½ hours for completion.

*Example 3*

The materials and procedures of Example 1 were used, except that the ethylene oxide was replaced by an equal weight of butylene oxide.

The resultant product was free flowing with a butoxy content of 30% and was completely soluble in ambient temperature or colder water.

*Example 4*

75 parts of the same lot of polyvinyl alcohol as used in Example 1 was fractured in an Entoleter grinder until 95% of the alcohol passed through a 140 mesh screen and then charged with 1 part of gaseous ammonia into a pressure reactor. The mixture was stirred continuously and 25 parts of ethylene oxide pumped in slowly. The reaction continued for 1 hour with the temperature being maintained at about 70°–75° C. and the pressure at about 100 p.s.i.

The ethoxylated product was granular, free flowing ethoxylated polyvinyl alcohol with an ethoxy content of 25%.

*Example 5*

The materials and procedures of Example 4 were used, except that 7.8 parts of a swelling agent, dimethyl sulfoxide, was thoroughly mixed with the fractured alcohol prior to charging the alcohol into the reactor.

*Example 6*

The materials and procedures of Example 5 were used except that the polyvinyl alcohol was not fractured prior to admixture with the dimethyl sulfoxide.

The alkoxylated polyvinyl alcohols are made into films by the usual procedures. For example, the alkoxylated polyvinyl alcohols are dissolved in water to form 20% aqueous solutions and cast onto plates as 20 mil thick wet films. The wet films are dried by heating at 120° C. for about 10 minutes and the resultant dried films stripped from the plate. The films are completely cold water soluble.

The films made of alkoxylated polyvinyl alcohols of the present invention are particularly suitable for the preparation of water soluble packages.

It is to be understood that it is intended to cover all changes and modifications of the examples of the invention herein chosen for the purpose of illustration which do not constitute departures from the spirit and scope of the invention.

We claim:
1. The process of making alkoxylated polyvinyl alcohol which comprises maintaining a $C_2$–$C_4$ alkylene oxide having an oxirane group therein in contact with polyvinyl alcohol and a catalyst at an elevated temperature, the catalyst being selected from the group consisting of ammonia and a mixture of ammonia and a $C_2$–$C_4$ alkanol amine.

2. The process of claim 1, the catalyst being ammonia in the form of a solution of ammonium hydroxide.

3. The process of claim 1, the catalyst being a mixture of ammonium hydroxide solution and triethanol amine.

4. The process of claim 3, the proportion of the triethanol amine being in excess of the ammonium hydroxide and the proportion of the catalyst mixture being about 0.2–5 parts for 100 parts of the polyvinyl alcohol.

5. The process as set forth in claim 1 in which the polyvinyl alcohol, prior to being maintained in contact with the alkylene oxide, is fractured to particles of size to pass to the extent of at least 80% by weight through a 100 mesh screen, the alcohol being maintained during the fracturing thereof at a temperature below 35° C.

6. The process according to claim 1 in which the polyvinyl alcohol, prior to being reacted with the alkylene oxide, is mixed with at least 3 parts by weight for 100 parts by weight of the alcohol, of an organic polar swelling agent for said alcohol.

7. The process of making alkoxylated polyvinyl alcohol which comprises the steps of fracturing polyvinyl alcohol to particles of size to pass to the extent of at least 80% by weight through a 100 mesh screen, the alcohol being maintained during the fracturing thereof at a temperature below 35° C., mixing said fractured alcohol with an organic swelling agent therefor in an amount sufficient to swell the particles and increase their surface area, reacting the thus treated polyvinyl alcohol with a $C_2$–$C_4$ alkylene oxide having an oxirane group therein in the presence of a catalyst selected from the group consisting of ammonia and mixtures of ammonia and a $C_2$–$C_4$ alkanol amine.

References Cited in the file of this patent
UNITED STATES PATENTS 2,448,260    Flodin _____ Aug. 31, 1948